United States Patent
Ahn et al.

(10) Patent No.: US 9,134,508 B2
(45) Date of Patent: Sep. 15, 2015

(54) IMAGING LENS SYSTEM

(71) Applicant: KOLEN CO., LTD., Gyeonggi-do (KR)

(72) Inventors: Chi Ho Ahn, Gyeonggi-do (KR); Jae Hoon Cho, Seongnam Si (KR); Ji Eun Kim, Seongnam-si (KR); Chan Goo Kang, Daejeon (KR); Se Jin Kim, Seoul (KR)

(73) Assignee: KOLEN CO., LTD. (KR)

( * ) Notice: Subject to any disclaimer, the term of this patent is extended or adjusted under 35 U.S.C. 154(b) by 22 days.

(21) Appl. No.: 14/068,679

(22) Filed: Oct. 31, 2013

(65) Prior Publication Data
US 2014/0184875 A1    Jul. 3, 2014

(30) Foreign Application Priority Data
Dec. 31, 2012    (KR) .................. 10-2012-0158536

(51) Int. Cl.
*G02B 3/02* (2006.01)
*G02B 13/00* (2006.01)

(52) U.S. Cl.
CPC ................... *G02B 13/0035* (2013.01)

(58) Field of Classification Search
USPC ........................................... 359/716
See application file for complete search history.

(56) References Cited

U.S. PATENT DOCUMENTS

| 2011/0228157 A1 | 9/2011 | Tang et al. | |
| 2011/0310493 A1 * | 12/2011 | Park et al. | 359/708 |
| 2013/0208366 A1 * | 8/2013 | Tsai et al. | 359/716 |

OTHER PUBLICATIONS

Korean Intellectual Property Office Notice of Non-Final Rejection Application No. 10-2012-0158536 Issued: Dec. 24, 2013 7 pages.

* cited by examiner

*Primary Examiner* — James Jones
(74) *Attorney, Agent, or Firm* — St. Onge Steward Johnston & Reens LLC

(57) ABSTRACT

An imaging lens system includes, sequentially from an object side to an image side: a first lens having a positive refractive power; a second lens having a negative refractive power; and a third lens having a positive refractive power or a negative refractive power, wherein a viewing angle θ satisfies following condition, $$0.7 < |\tan \theta| < 1.5.$$

14 Claims, 6 Drawing Sheets

IMAGING LENS SYSTEM

FIELD OF THE INVENTION

The present invention relates to an imaging lens system.

BACKGROUND OF THE INVENTION

Cameras using a solid state image sensor such as a charge coupled device (CCD) or a complementary metal oxide semiconductor (CMOS) image sensor have been rapidly distributed.

In order to improve a resolution of a camera, a degree of pixel integration of a solid state image sensor has to be increased. Also, as cameras have become smaller and lighter due to the improvement of performance of lens optics built into them, and thus, cameras are being widely integrated into various mobile devices.

In lens optics included in such cameras, when the number of lenses increases, a desired performance may be obtained; however, increasing the number of lenses is not suitable for small and light cameras with lower costs. Thus, a design is necessary that is suitable for obtaining the desired performance of small and light cameras.

In such a lens design, a method of realizing a fixed focus lens system by using two to four lenses is being widely used, and a structure of an individual lens is determined in consideration of merits in each case, and specification of a desired performance. For example, if two lenses are used, aberration may not be sufficiently corrected in accordance that a size of pixel is reduced. If four lenses are used, the aberration may be sufficiently corrected, but the total length of the lens system is increased.

Therefore, various designs for meeting desired performance specifications such as a focal length, a viewing angle, and aberration correction by using a small number of lenses, that is, two to four lenses, are being suggested.

SUMMARY OF THE INVENTION

The present invention provides an imaging lens system including three lenses.

According to an aspect of the present invention, there is provided an imaging lens system including, sequentially from an object side to an image plane side: a first lens having a positive refractive power; a second lens having a negative refractive power; and a third lens having a positive refractive power or a negative refractive power, wherein a viewing angle θ satisfies following condition, $0.7 < |\tan \theta| < 1.5$.

The imaging lens system may further satisfy following condition $4.8 < f/D1 < 5.0$, where f denotes a focal length of the imaging lens system, and D1 is a semi-aperture of the first lens at the object side.

The imaging lens system may further satisfy following condition $0.7 < TTL/f < 1.2$, where TTL denotes a distance from an object side surface of the first lens to the image plane, and f denotes a focal length of the imaging lens system.

The imaging lens system may further satisfy following condition $0.7 < TTL/f < 1.2$, where TTL denotes a distance from an object side surface of the first lens to the image plane, and f denotes a focal length of the imaging lens system.

The imaging lens system may further satisfy following condition $1.95 < D1/D3 < 1.5$, where D1 denotes a semi-aperture of the first lens at the object side, and D3 denotes a semi-aperture of the third lens at the image plane side.

The second lens may have the smallest semi-aperture from among the first lens, the second lens, and the third lens.

The first lens may have a meniscus shape that is convex toward the object side.

The second lens may have a biconcave shape.

The third lens may have a meniscus shape that is convex toward the image plane side.

The first lens may have at least one aspherical surface.

The second lens may have at least one aspherical surface.

The third lens may have at least one aspherical surface.

The first lens, the second lens, and the third lens may be formed of a plastic material.

A stop may be disposed between the first lens and the second lens.

An infrared-ray (IR) pass filter may be disposed between the third lens and an image plane.

According to another aspect of the present invention, there is provided an imaging apparatus including: an imaging lens system as described above; and an image sensor for converting an optical image formed by the imaging lens system into an electric signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
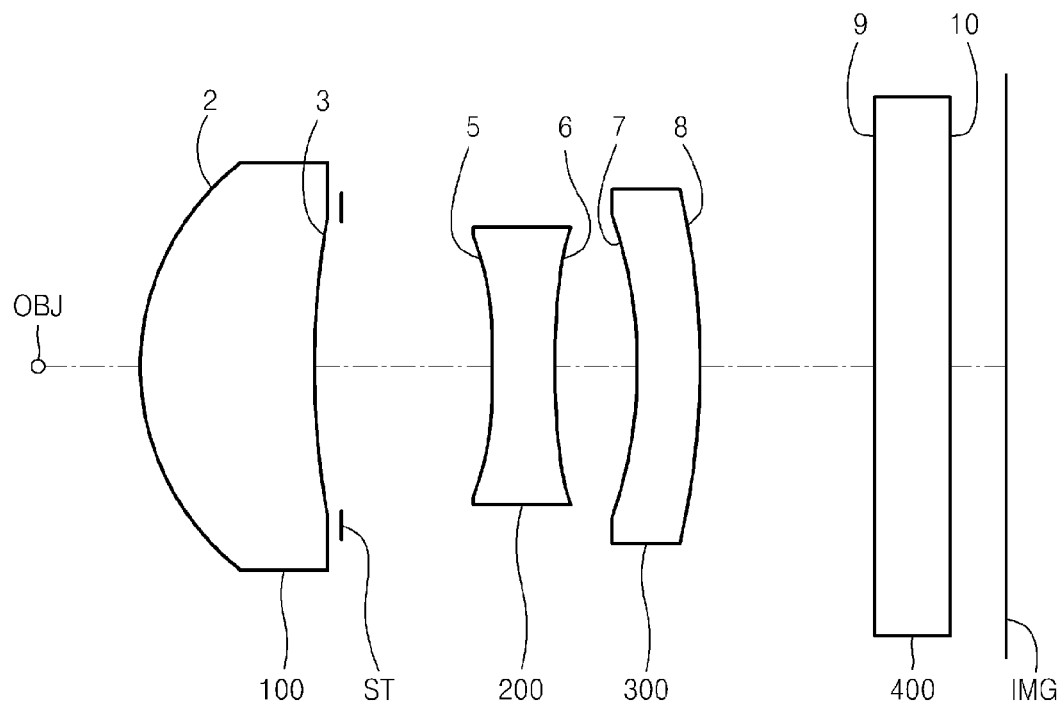
FIG. 1 is a diagram showing an optical arrangement of an imaging lens system according to an embodiment of the present invention.

Hereinafter, the present invention will be described in detail by explaining preferred embodiments of the invention with reference to the attached drawings. Like reference numerals in the drawings denote like elements.

Figure 3:
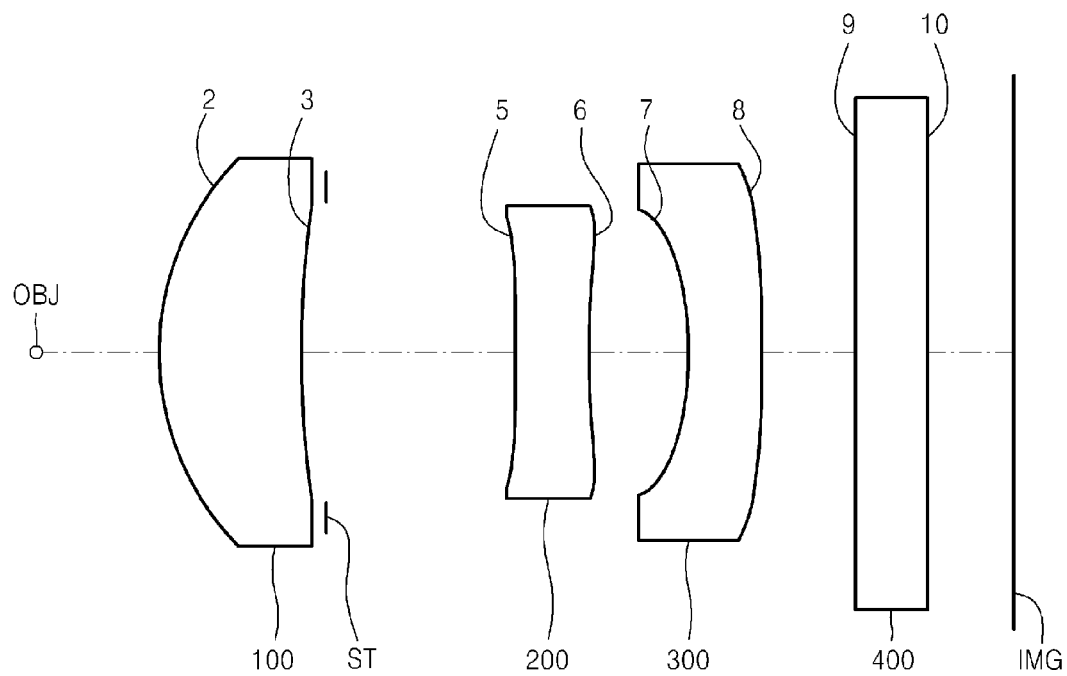
FIG. 3 is a diagram showing an optical arrangement of an imaging lens system according to another embodiment of the present invention.
Figure 5:
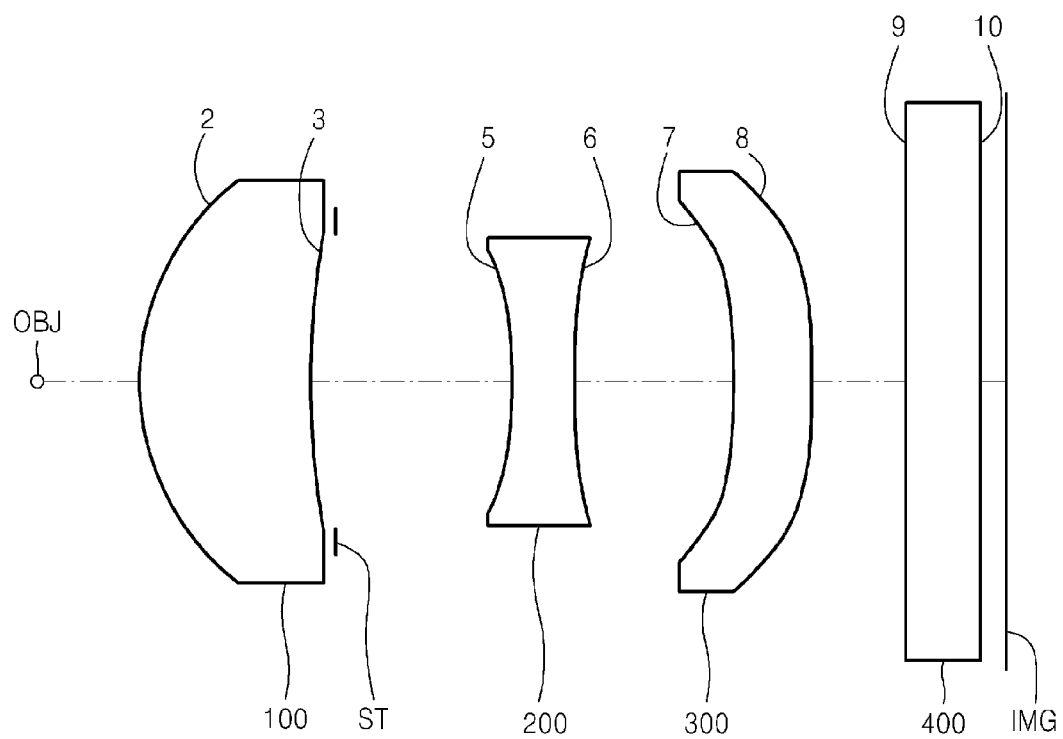
FIG. 5 is a diagram showing an optical arrangement of an imaging lens system according to another embodiment of the present invention.

FIGS. 1, 3, and 5 are diagrams showing imaging lens systems according to embodiments of the present invention.

Referring to FIGS. 1, 3, and 5, an imaging lens system includes a first lens 100 having a positive refractive power, a second lens 200 having a negative refractive power, and a third lens 300 having a positive or negative refractive power that are sequentially arranged from an object OBJ side to an image plane IMG side.

A viewing angle θ of the imaging lens system satisfies following condition.

$$0.7 < |\tan \theta| < 1.5 \quad (1)$$

The above condition (1) defines the viewing angle of the imaging lens system. In a range that exceeds the highest limit, a spherical aberration and a coma aberration increase. In a range that is below the lowest limit, the spherical aberration and the coma aberration are reduced, and the viewing angle is excessively reduced.

The imaging lens system may further satisfy following condition.

$$4.8 < f/D1 < 5.0 \quad (2)$$

Here, f denotes a focal length of the imaging lens system, and D1 is a semi-aperture of the first lens 100 at the object side.

The condition (2) regards the semi-aperture of the first lens 100. The condition (2) limits the semi-aperture of the first lens 100 that is closest to the object side in order to ensure an optical path and to ensure a thickness at edges of the second lens 200 and the third lens 300.

The imaging lens system may further satisfy following condition.

$$0.7 < TTL/f < 1.2 \quad (3)$$

Here, TTL denotes a total length of the imaging lens system, that is, a distance from an object side surface of the first lens 100 to the image plane IMG, and f denotes a focal length of the imaging lens system.

The above condition (3) is a condition for realizing the spherical aberration correction function and a compact size of the imaging lens system. When the highest limit in the condition (3) is exceeded, the spherical aberration may be easily corrected; however, the total length of the imaging lens system becomes too long. On the other hand, when a value TTL/f falls below the lowest limit in the condition (3), the imaging lens system becomes compact; however, it is difficult to correct the spherical aberration.

The imaging lens system may further satisfy following condition.

$$0.95 < D1/D3 < 1.5 \quad (4)$$

Here, D1 denotes a semi-aperture of the first lens 100 at the object OBJ side, and D3 denotes a semi-aperture of the third lens 300 at the image plane IMG side.

According to the imaging lens system, the semi-aperture of the second lens 200 is the smallest and the semi-aperture of the first lens 100 is the largest or slightly smaller than that of the third lens 300, unlike a general lens system including three lenses, in which a semi-aperture of a first lens is the smallest. The condition (4) defines a ratio of the semi-aperture of the first lens 100 at the object OBJ side with respect to the semi-aperture of the third lens 300 at the object OBJ side, that is, how much the semi-aperture of the first lens 100 is greater or smaller than that of the third lens 300.

Each of the lenses configuring the imaging lens system will be described in detail as follows.

The first lens 100 has a positive refractive power, and may be formed as a meniscus that is convex toward the object side. The first lens 100 may have at least one aspherical surface, or opposite surfaces may be both aspherical surfaces. The first lens 100 may have the largest refractive power among the lenses configuring the imaging lens system, and may have the semi-aperture that is the largest or slightly smaller than that of the third lens 300.

The second lens 200 has a negative refractive power, and may have a biconcave shape. The second lens 200 may have at least one aspherical surface, or opposite surfaces may be both aspherical surfaces. The second lens may have the smallest semi-aperture from among the lenses configuring the imaging lens system.

The third lens 300 has a negative or a positive refractive power, and may be formed as a meniscus shape that is convex toward the image plane IMG side. The third lens 300 may have at least one aspherical surface, or opposite surfaces may be both aspherical surfaces.

The second and third lenses 200 and 300 may serve as correcting lenses, and may correct various aberrations by adopting aspherical surfaces.

A stop ST may be disposed between the first and second lenses 100 and 200. However, a location of the stop ST is not limited thereto.

The first, second, and third lenses 100, 200, and 300 may be formed as a plastic material; however, the present invention is not limited thereto, and the first, second, and third lenses 100, 200, and 300 may be formed as a glass material. If the plastic material is used, manufacturing costs may be reduced less than a case where the glass material is used.

An infrared-ray (IR) pass filter 400 may be disposed between the third lens 300 and the image plane IMG. The IR pass filter 400 may transmit light of near-IR band, for example, a wavelength band of about 800 nm to about 950 nm.

An image sensor (not shown) such as a charge coupled device (CCD) or a complementary metal oxide semiconductor (CMOS) may be disposed at the image plane IMG.

Hereinafter, lens data according to embodiments of the present invention will be described in detail. In lens data, S denotes a surface number, ST denotes a stop, R denotes a radius of curvature, T denotes a thickness or a distance, Nd denotes a refractive index, and Vd denotes an Abbe's number. In addition, Fno. denotes an F number, and f denotes a focal length of the imaging lens system. R, T, and f may be represented in a unit of mm, and * marked after the number of surface denotes that the surface is an aspherical surface.

The aspherical surface in the embodiments of the present invention may be defined as follows.

$$Z = \frac{Y^2}{R(1 + \sqrt{1 - (1+K)Y^2/R^2})} + AY^4 + BY^6 + CY^8 + DY^{10} + EY^{12} + FY^{14} + GY^{16} + HY^{18} + JY^{20}$$

Here, Z denotes a distance from an vertex of the lens in an optical axis, Y denotes a distance in a direction perpendicular to the optical axis, K denotes a conic constant, A, B, C, D, E, F, G, H, and J denote aspherical coefficients, and R is a radius of curvature at the vertex of the lens.

<First Embodiment>

FIG. 1 shows an optical arrangement of the imaging lens system according to the first embodiment of the present invention. The imaging lens system of the present embodiment includes the first lens 100 having the positive refractive power, the second lens 200 having the negative refractive power, and the third lens 300 having the negative refractive power. Lens data of the first embodiment is as follows.

TABLE 1

Fno. = 2.8, f = 3.960

| S | R | T | Nd | Vd |
|---|---|---|---|---|
| OBJ | infinity | | | |
| 2* | 0.9953 | 0.6971 | 1.5238 | 55.7282 |
| 3* | 4.3884 | 0.1000 | | |
| ST | infinity | 0.6053 | | |
| 5* | −2.6292 | 0.2500 | 1.5238 | 55.7282 |
| 6* | 3.5273 | 0.3233 | | |
| 7* | −2.5964 | 0.2500 | 1.5238 | 55.7282 |
| 8* | −5.2291 | 0.7000 | | |
| 9 | infinity | 0.3000 | 1.5098 | 64.1664 |
| 10 | infinity | 0.2243 | | |
| IMG | infinity | 0.000 | | |

Aspherical coefficients are as follows.

TABLE 2

| S | 2 | 3 | 5 | 6 | 7 | 8 |
|---|---|---|---|---|---|---|
| K | −0.5172 | 1.7691 | 0 | 27.1168 | −68.1045 | −53.8644 |
| A | 0.0483 | 0.0331 | −0.2962 | −0.0624 | −0.9133 | −0.3253 |
| B | 0.0311 | 8.33E−05 | 0.3188 | 0.4151 | 2.3141 | 0.5406 |
| C | 0.062 | 0.3567 | −1.9411 | 0.2819 | −4.5741 | −0.661 |
| D | −0.0194 | −0.4799 | — | −1.648 | 5.9859 | 0.4342 |
| E | 0.0143 | −1.3859 | — | 4.2046 | — | 0.1089 |
| F | 0.0901 | 0.5403 | — | — | — | — |
| G | 0.0034 | 8.4537 | — | — | — | — |
| H | −0.2013 | 10.6153 | — | — | — | — |
| J | 0.273 | −40.1114 | — | — | — | — |

Figure 2:
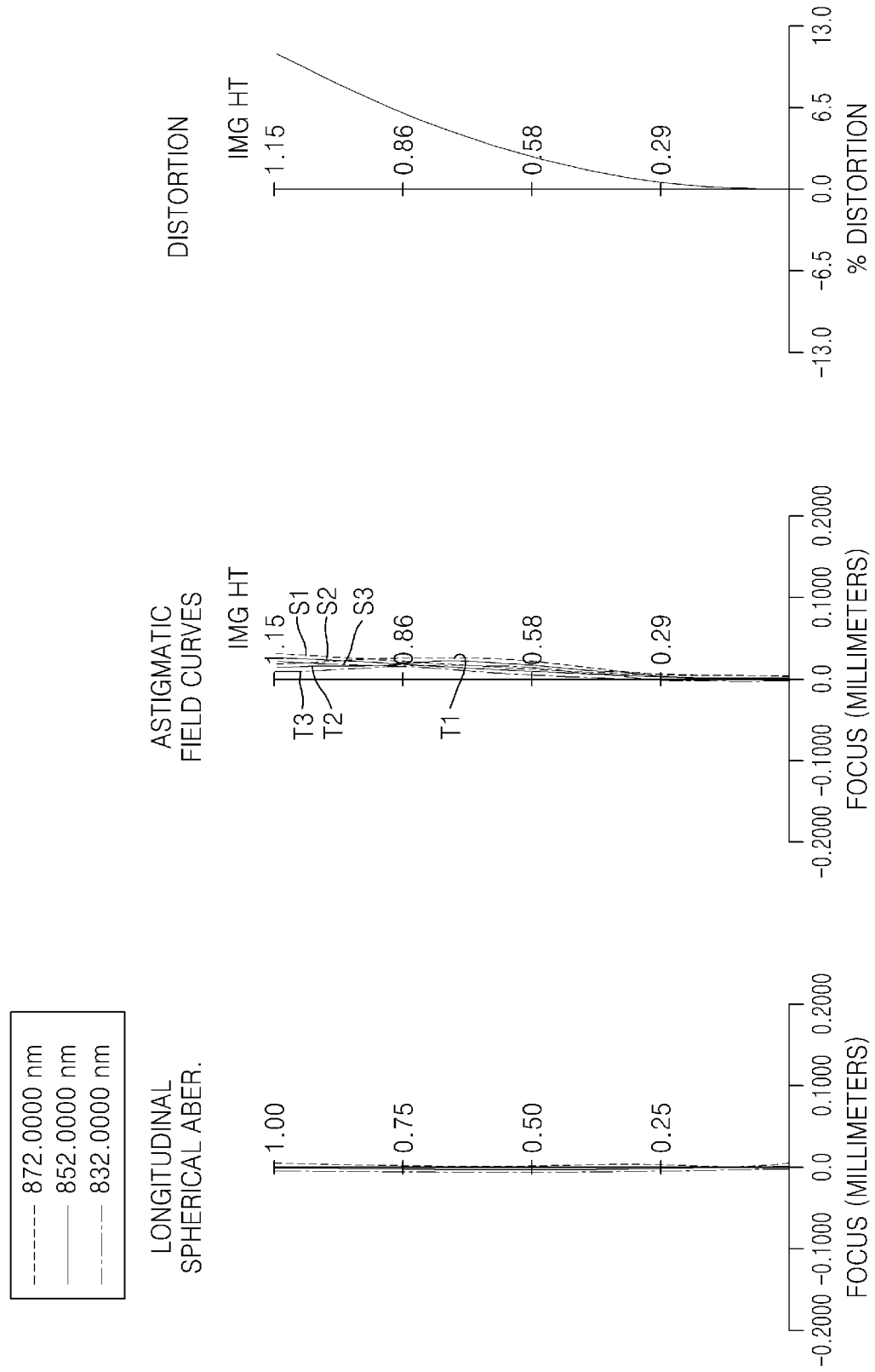
FIG. 2 is an aberration diagram showing a spherical aberration in a longitudinal direction, a field curvature, and a distortion of the imaging lens system according to the embodiment of the present invention.

FIG. 2 shows a longitudinal spherical aberration, an astigmatic field curves, and a distortion of the imaging lens system according to the first embodiment of the present invention.

The longitudinal spherical aberration, the astigmatic field curves, and the distortion are shown with respect to light having wavelengths of 872 nm, 852 nm, and 832 nm. In the astigmatic field curves, T1, T2, and T3 denote curvatures with respect to the three wavelengths on a tangential surface, and S1, S2, and S3 denote curvatures with respect to the three wavelengths on a sagittal surface.

<Second Embodiment>

FIG. 3 shows an optical arrangement of the imaging lens system according to the second embodiment of the present invention. The imaging lens system of the present embodiment includes the first lens 100 having the positive refractive power, the second lens 200 having the negative refractive power, and the third lens 300 having the negative refractive power. Lens data of the second embodiment is as follows.

TABLE 3

Fno. = 2.80, f = 3.9218

| S | R | T | Nd | Vd |
|---|---|---|---|---|
| OBJ | infinity | | | |
| 2* | 1.1222 | 0.5783 | 1.5238 | 55.7282 |
| 3* | 5.9518 | 0.1000 | | |
| ST | infinity | 0.7752 | | |
| 5* | −16.6151 | 0.3000 | 1.5238 | 55.7282 |
| 6* | 3.8934 | 0.4076 | | |
| 7* | −1.4848 | 0.3000 | 1.5238 | 55.7282 |
| 8* | −5.6772 | 0.3833 | | |
| 9 | infinity | 0.3000 | 1.5098 | 64.1664 |
| 10 | infinity | 0.3455 | | |
| IMG | infinity | 0.000 | | |

Aspherical coefficients are as follows.

TABLE 4

| S | 2 | 3 | 5 | 6 | 7 | 8 |
|---|---|---|---|---|---|---|
| K | −0.4776 | 34.0241 | 0 | 39.5785 | −30.8059 | 50.4284 |
| A | 0.0664 | 0.0621 | −0.0969 | −0.0968 | −1.112 | 0.0176 |
| B | −0.0588 | −0.191 | −0.7016 | 0.2877 | 2.4774 | 0.1039 |
| C | 0.0454 | 0.3434 | 3.6333 | −3.0536 | 4.9918 | −0.7262 |
| D | 0.117 | −0.0042 | −8.6453 | −0.9775 | −7.4794 | 0.6756 |
| E | 0.0795 | −0.5469 | −34.7736 | 3.0313 | 5.7582 | −0.2405 |
| F | −0.0911 | −0.3325 | 26.2057 | 25.0121 | −13.0947 | −1.2009 |
| G | −0.2844 | 1.8251 | 274.6955 | 29.7051 | −0.7429 | 1.3057 |
| H | −0.2062 | 4.0783 | 680.4705 | −54.1308 | −76.9685 | 6.3083 |
| J | 0.6225 | −10.4814 | −2837.6044 | −425.7552 | 0.1259 | −6.2813 |

Figure 4:
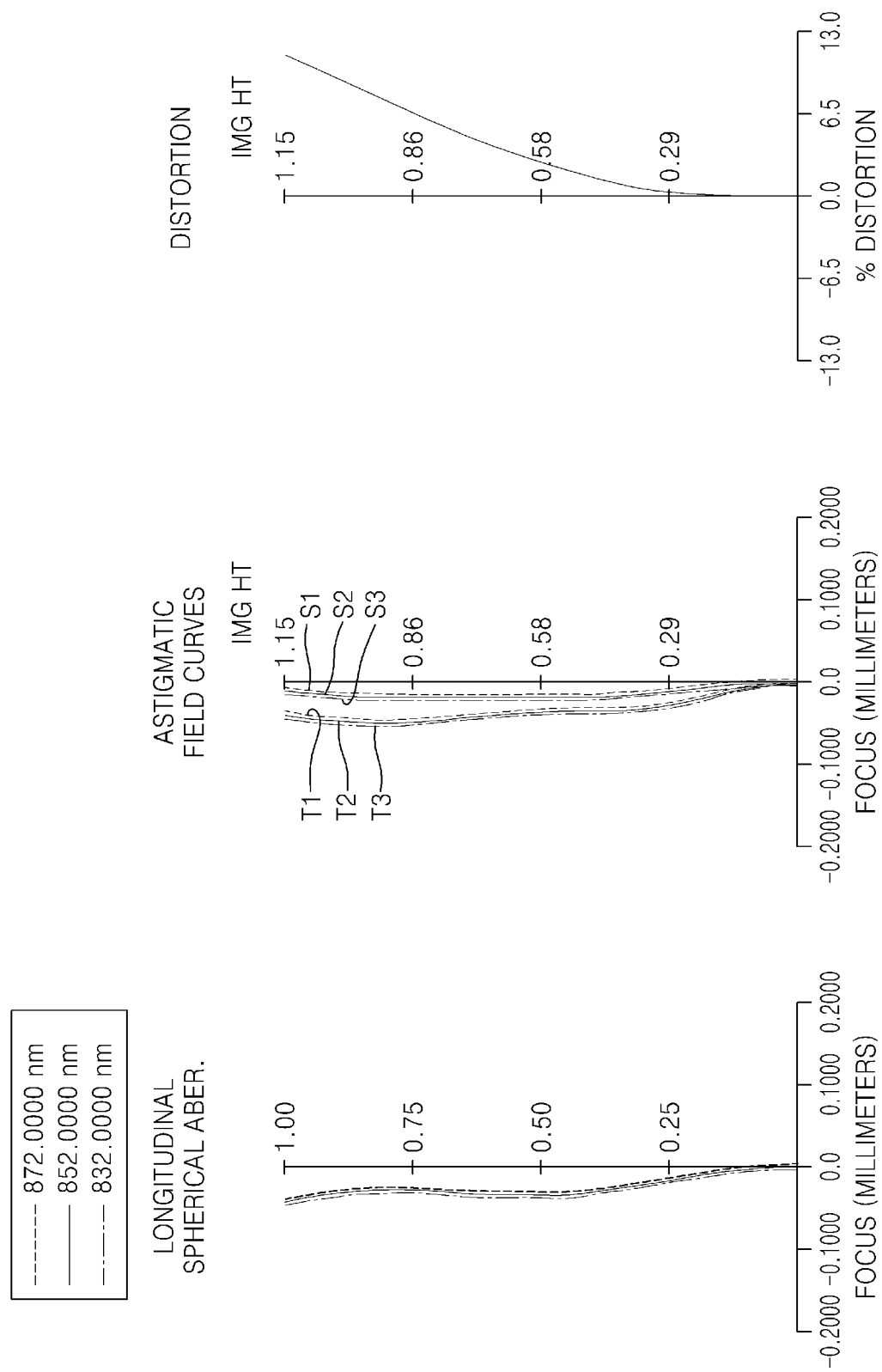
FIG. 4 is an aberration diagram showing a spherical aberration in a longitudinal direction, a field curvature, and a distortion of the imaging lens system of FIG. 3.

FIG. 4 shows a longitudinal spherical aberration, an astigmatic field curves, and a distortion of the imaging lens system according to the second embodiment of the present invention.

The longitudinal spherical aberration, the astigmatic field curves, and the distortion are shown with respect to light having wavelengths of 872 nm, 852 nm, and 832 nm. In the astigmatic field curves, T1, T2, and T3 denote curvatures with respect to the three wavelengths on a tangential surface, and S1, S2, and S3 denote curvatures of the three wavelengths on a sagittal surface.

<Third Embodiment>

FIG. 5 shows an optical arrangement of the imaging lens system according to the third embodiment of the present invention. The imaging lens system of the present embodiment includes the first lens 100 having the positive refractive power, the second lens 200 having the negative refractive power, and the third lens 300 having the positive refractive power. Lens data of the third embodiment is as follows.

TABLE 5

| Fno. = 2.71, f = 3.9983 | | | | |
|---|---|---|---|---|
| S | R | T | Nd | Vd |
| OBJ | infinity | | | |
| 2* | 1.0264 | 0.6918 | 1.5238 | 55.7282 |
| 3* | 5.0664 | 0.1000 | | |
| ST | infinity | 0.7128 | | |
| 5* | −1.9478 | 0.2500 | 1.5238 | 55.7282 |
| 6* | 3.0245 | 0.6457 | | |
| 7* | −5.2802 | 0.3164 | 1.5238 | 55.7282 |
| 8* | −5.3384 | 0.3833 | | |
| 9 | infinity | 0.3000 | 1.5098 | 64.1664 |
| 10 | infinity | 0.1000 | | |
| IMG | infinity | 0.000 | | |

Aspherical coefficients are as follows.

TABLE 6

| S | 2 | 3 | 5 | 6 | 7 | 8 |
|---|---|---|---|---|---|---|
| K | −0.5097 | 13.621 | 0 | 14.2845 | −566.8943 | 26.8594 |
| A | 0.051 | 0.0549 | 0.2878 | −0.0843 | −1.0301 | −0.6244 |
| B | 0.0234 | −0.0407 | 0.2057 | 0.3627 | 1.9911 | 0.6199 |
| C | 0.0784 | 0.4394 | −1.178 | 0.0432 | −5.5022 | −0.9085 |
| D | −0.0048 | −0.2879 | — | −2.0204 | 5.5169 | 0.1173 |
| E | 0.0114 | −1.2798 | — | 4.3415 | — | 0.5835 |
| F | 0.0719 | 0.1507 | — | — | — | — |
| G | −0.0062 | 7.1815 | — | — | — | — |
| H | −0.1666 | 9.731 | — | — | — | — |
| J | 0.3687 | −30.964 | — | — | — | — |

Figure 6:
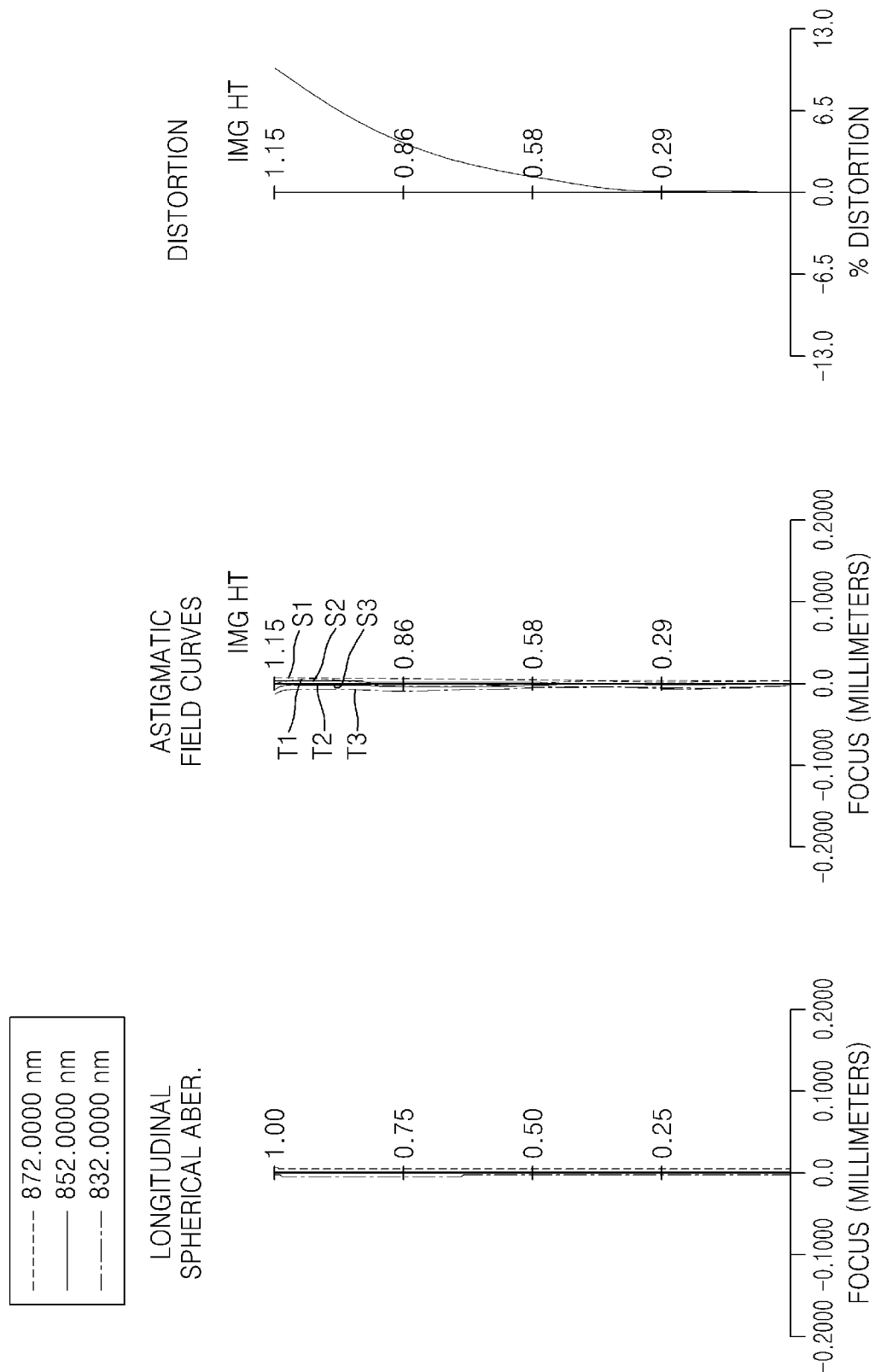
FIG. 6 is an aberration diagram showing a spherical aberration in a longitudinal direction, a field curvature, and a distortion of the imaging lens system of FIG. 5.

FIG. 6 shows a longitudinal spherical aberration, an astigmatic field curves, and a distortion of the imaging lens system according to the third embodiment of the present invention.

The longitudinal spherical aberration, the astigmatic field curves, and the distortion are shown with respect to light having wavelengths of 872 nm, 852 nm, and 832 nm. In the astigmatic field curves, T1, T2, and T3 denote curvatures of the three wavelengths on a tangential surface, and S1, S2, and S3 denote curvatures with respect to the three wavelengths on a sagittal surface.

Following table shows lens data relating to the above conditions 1 through 4 in each embodiment, and shows that the lens data satisfies the above conditions 1 through 4.

TABLE 7

| | First embodiment | Second embodiment | Third embodiment |
|---|---|---|---|
| θ | 28.04 | 28.4 | 28.4 |
| tan θ | 0.54 | 0.54 | 0.54 |
| Condition 1 | 0.54 | 0.54 | 0.54 |
| D1 | 0.8 | 0.79 | 0.81 |
| f | 3.96 | 3.92 | 4 |
| Condition 2 | 4.95 | 4.96 | 4.94 |
| TTL | 3.45 | 3.49 | 3.5 |
| f | 3.96 | 3.92 | 4 |
| Condition 3 | 0.87 | 0.89 | 0.88 |
| D1 | 0.8 | 0.79 | 0.81 |
| D3 | 0.7 | 0.77 | 0.84 |
| Condition 4 | 1.14 | 1.03 | 0.96 |

The imaging lens system may configure an optical system having excellent optical performances with small size and light weight by using three lenses.

Since the imaging lens system may adopt the aspherical surface on at least one surface of the lenses, the aberration may be corrected easily, and manufacturing costs may be reduced by using the plastic material.

According to the embodiments of the present invention, the imaging lens system having excellent optical performances and small and light structure may be configured. The imaging lens system of the present invention may be adopted in various kinds of imaging apparatuses with an image sensor that converts an optical image formed by the imaging lens system into an electric signal.

Also, the imaging lens system may be used to sense a motion by using near IR band light, and may be adopted in various electronic devices and portable devices requiring a motion sensing performance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging lens system comprising, sequentially from an object side to an image plane side:
   a first lens having a positive refractive power;
   a second lens having a negative refractive power; and
   a third lens having a positive refractive power or a negative refractive power,
   wherein a viewing angle θ satisfies following condition, $0.7 < |\tan \theta| < 1.5$, wherein the imaging lens system further satisfies following condition, $4.8 < f/D1 < 5.0$, where f denotes a focal length of the imaging lens system, and D1 is a semi-aperture of the first lens at the object side.

2. The imaging lens system of claim 1, wherein the imaging lens system further satisfies following condition $0.7 < TTL/f < 1.2$, where TTL denotes a distance from an object side surface of the first lens to the image plane, and f denotes a focal length of the imaging lens system.

3. An imaging lens system comprising, sequentially from an object side to an image plane side: a first lens having a positive refractive power; and a second lens having a negative refractive power; and a third lens having a positive refractive power or a negative refractive power, wherein a viewing angle θ satisfies the following condition, $0.7 < |\tan \theta| < 1.5$, wherein the imaging lens system further satisfies following condition $1.95 < D1/D3 < 1.5$, where D1 denotes a semi-aperture of the first lens at the object side, and D3 denotes a semi-aperture of the third lens at the image plane side.

4. An imaging lens system comprising, sequentially from an object side to an image plane side: a first lens having a positive refractive power; and a second lens having a negative refractive power; and a third lens having a positive refractive power or a negative refractive power, wherein a viewing angle θ satisfies the following condition, $0.7 < |\tan \theta| < 1.5$, wherein the second lens has a semi-aperture which is the smallest from among the first lens, the second lens, and the third lens.

5. The imaging lens system of claim 1, wherein the first lens has a meniscus shape that is convex toward the object side.

6. The imaging lens system of claim 1, wherein the second lens has a biconcave shape.

7. The imaging lens system of claim 1, wherein the third lens has a meniscus shape that is convex toward the image plane side.

8. The imaging lens system of claim 1, wherein the first lens has at least one aspherical surface.

9. The imaging lens system of claim 1, wherein the second lens has at least one aspherical surface.

10. The imaging lens system of claim 1, wherein the third lens has at least one aspherical surface.

11. The imaging lens system of claim 1, wherein the first lens, the second lens, and the third lens are formed of a plastic material.

12. The imaging lens system of claim 1, wherein a stop is disposed between the first lens and the second lens.

13. The imaging lens system of claim 1, wherein an infrared-ray (IR) pass filter is disposed between the third lens and an image plane.

14. An imaging apparatus comprising:
   an imaging lens system of claim 1; and
   an image sensor for converting an optical image formed by the imaging lens system into an electric signal.

* * * * *